United States Patent Office 2,945,404
Patented July 19, 1960

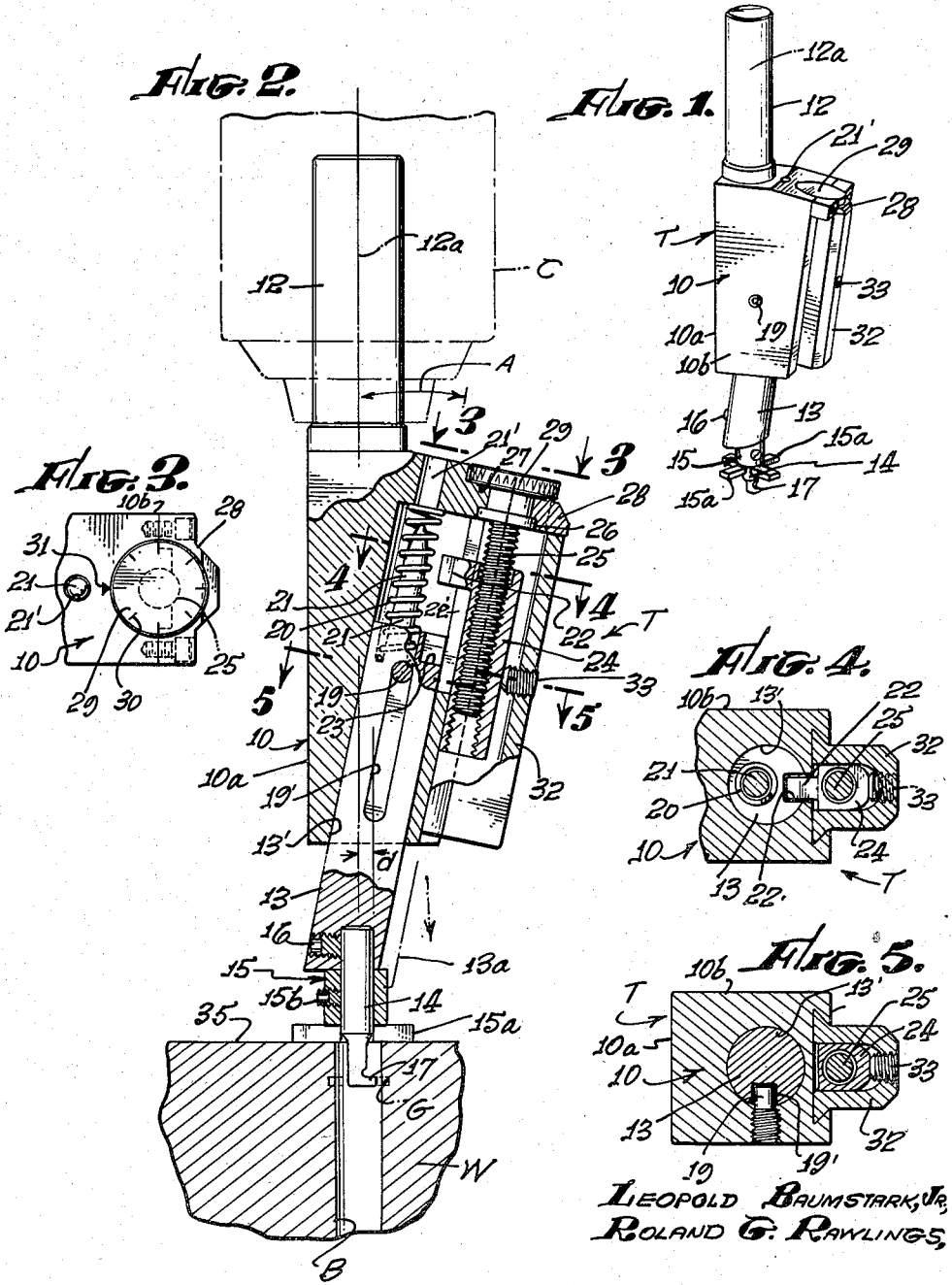

2,945,404
GROOVING AND RECESSING TOOL

Leopold Baumstark, Jr., Beaumont, and Roland G. Rawlings, Banning, Calif.; said Rawlings assignor to said Baumstark Filed July 1, 1958, Ser. No. 746,024
3 Claims. (Cl. 77—58)

The present invention relates generally to machine tools, and more especially to a tool that may be used in a lathe, drill press, or other machine for cutting grooves and the like in a work piece.

It is a general object of our invention to provide a tool of this character for cutting grooves or recesses, especially in the inside wall of a cylindrical bore, which tool is adapted to reproduce exactly the grooves in a large number of work pieces and is therefore adapted to production work.

It is also an object of our invention to provide a tool of this character in which the depth of cut can be easily and accurately controlled.

The present invention comprises a body having a shank extending from one end by which the tool may be mounted in a chuck or the like, and a slidably mounted tool post extending from the other end of the body. The body may be mounted in a chuck for rotation about the axis of the shank to produce movement of the tool relative to the work piece, or the chuck may be stationary and the work piece rotated relative to the tool, as will be understood by those skilled in the art. The tool post is slidably mounted in the body to move longitudinally along its axis which is co-planar with and inclined at an angle to the axis of the shank. On the outer end of the tool post is a cutting tool or bit and also an abutment fixed relative to the tool post which engages the work piece in order to hold the post and the cutting tool against movement relative to the work piece in a direction parallel to the shank axis.

Our invention is characterized by a novel arrangement whereby an axial movement of the tool body toward the work piece causes the post to move into the body along the post axis. Since the post axis is inclined to the shank axis along which the body moves, this motion of the body causes the cutting tool to move radially outward from the shank axis to the extent required to produce the desired radial depth of the groove to be cut.

The tool also includes limit means by which the movement of the tool post along its axis relative to the body can be limited to a predetermined amount which bears a known relation to the radial movement of the cutting edge of the tool, whereby the radial depth of cut can be limited to a predetermined depth.

How the above and other objects and advantages of our invention are attained will be better understood by reference to the following description of a preferred embodiment of our invention and to the annexed drawing, in which:

Fig. 1 is a perspective view of the grooving tool alone.

Fig. 2 is a vertical median section of the tool, showing the tool mounted in the chuck of a drill press or the like for the purpose of rotating the tool to cut an internal groove in a bore within a work piece.

Fig. 3 is a fragmentary plan view taken on line 3—3 in Fig. 2.

Fig. 4 is a fragmentary section taken on line 4—4 of Fig. 2.

Fig. 5 is a transverse section taken on line 5—5 of Fig. 2.

Referring now to the drawing and particularly to Fig. 1, which shows in perspective a presently preferred embodiment of our invention, there is shown a tool generally indicated at T, this latter being used to refer to the entire tool assembly. Tool T comprises a body 10 having shank 12 extending from one end thereof and tool-carrying post 13 extending from the other end. At the outer or lower end of post 13 there is mounted cutting tool or bit 14 which is held in a suitable socket within the tool-carrying post by set screw 16.

As one example of the manner in which our improved tool may be used, the tool T is shown in Fig. 2 as being held in the chuck C of a drill press or the like, by which the tool may be rotated about axis 12a of the shank 12. The shank 12 provides a means for mounting the tool in any suitable chuck or collet either for the purpose of rotating the tool or holding the tool stationary. In the latter case, the work piece is rotated about axis 12a in order to obtain the necessary relative rotational movement between the tool and the work piece.

In Fig. 2, cutting tool 14 is shown as having its cutting edge 17 in engagement with the wall of an internal bore B which has been previously formed within the work piece W. Since the work piece may be held in any suitable manner, no means for holding it is shown in the drawing. Both the chuck C and the work piece W are shown fragmentarily since they respectively are merely typical of one way in which the tool may be mounted to cut a groove and a work piece which may be of any suitable type or configuration. However, in order to explain the operation of our tool, it is shown in Fig. 2 as being adapted to cut a single internal groove in the work piece by rotation of the tool about shank axis 12a which becomes the axis of relative rotation of the cutting tool and the work piece.

Body 10 preferably has one or more side surfaces as 10a and 10b in Figs. 2 and 5 that are flat and parallel to axis 12a. These may then be used if necessary to assist in aligning the cutting edge 17.

In a simplified form of the invention, post 13 may bear directly against the work piece W; but it is preferred to supply a separate abutment 15 which consists of a sleeve surrounding the shank portion of cutting tool 14 and a plurality of arms 15a that bear against the end surface 35 on the work piece. Abutment 15 may be loose to turn relative to the tool or it may be held in place by set screw 15b. The shank of tool 14 is a convenient means for mounting the abutment on the tool post; but any other means for holding the abutment in a fixed position relative to the post may be used.

Tool-carrying post 13 is slidably mounted in a cylindrical bore 13' cut into the tool body, and is spring loaded downward (in the drawing) by a compression spring 20 confined between one end of the bore 13' and the opposing end of tool post 13. A spring guide 21 extends within spring 20 from the top of post 13, to hold the spring in position during movement of the tool post. At the limit of the movement of the post toward the body, spring guide 21 extends into an opening 21' cut into the tool body.

A keyway 19' is cut into the side of tool post 13, parallel with the axis thereof, and a key or limit pin 19 is engaged therein. Pin 19 is provided with screw threads to engage a threaded bore in body 10 to hold the pin in place, as can be seen most clearly by reference to Fig. 5. Pin 19 serves the double purpose of securing the angular position of post 13 within the bore 13', and of limiting the axial movement of the post in either direction by engaging the ends of keyway 19'. Due to pressure from spring 20 pin 19 is normally held at the top of its keyway 19', as illustrated in Fig. 2. This position represents the maximum travel of tool post 13 away from body 10, and is the one occupied at the start of the radial travel of the tool bit 17 to cut a groove.

In operation, the tool is secured in chuck C as shown and cutting tool 14 lowered into bore B until abutment 15 engages the end surface of the work piece. Cutting edge 17 is spaced from the abutment a distance equal to the distance the cut is to be from the end of bore B. Cutting tool 14 is shaped by grinding to provide the cutting edge 17 which cuts groove G shown in broken lines in Fig. 2, of a shape corresponding to the shape of cutter 17.

This embodiment of the invention also contains means for adjustably setting the limit of radial movement of the bit, to control the depth of cut, at any desired point between zero, or the starting position, and the maximum limit is determined by the length of keyway 19'. It should be understood, however, that this specific adjustment means is not essential to the invention, since the same result could be gained by other suitable means. The adjustment means comprises a lug 22 which extends through slot 22' into bore 13' and is adapted to engage an end surface 23 on tool post 13. Lug 22 is rigidly attached to a traveling block 24, which has a threaded bore engaging adjustment screw 25. Screw 25 is held fixed with relation to tool body 10 by means of parallel flanges 26 and 27 at its upper end which bear in grooves cut in the body 10 and in a semi-circular yoke 28 which is attached to the body 10 by means of screws.

Knurled adjustment head 29 of the screw 25 seats with clearance in a recess cut into body 10 and semi-circular yoke 28, and projects above the yoke as best illustrated in Fig. 1. Head 29 can be manually turned at that point. When head 29 is turned, the screw 25, being axially constrained by its parallel flanges 26 and 27 in the body of the tool assembly, causes block 24 to move axially relative to the bore 13'. Lug 22 is thereby moved in its slot 22' to any desired position relative to surface 23. In the position illustrated in Fig. 2 the lug engages surface 23 and limits the inward movement of post 13 before pin 19 touches the bottom of keyway 19'. By appropriate adjustment lug 22 can be set to limit the total movement of post 13 to any desired value between zero and the maximum limit as set by the length of the keyway 19'. The limit on travel set by the position of lug 22 is reflected in a corresponding limit on the radially outward movement of tool bit from its zero position, which is the position illustrated in Fig. 2, to its maximum radially outward position, as indicated by the bottom of the groove G of Fig. 2. Therefore by this adjustment means the depth of the groove cut into the work piece can be varied continuously from zero to the maximum limit determined by the structure of the specific embodiment. The adjustment can be held fixed at any desired position by setscrew 33 threaded through housing 32, which is held to tool body 10 by a tongue and groove arrangement, as illustrated in Figs. 4 and 5. The housing serves in addition as a guide for traveling block 24, and as a protective covering for the screw 25 and slot 22'.

The head 29 of the adjustment screw is preferably marked with graduations 30, as illustrated in Fig. 3, which are calibrated to indicate the maximum radial displacement of cutting edge 17 corresponding to the position of adjustment head 29 relative to an index 31 marked on the surface of the tool body. The markings on the head 29 constitute a fine calibration scale for reading fractions of a turn of the head, and there is no coarse scale provided in this embodiment. The coarse reading is taken by advancing the stop lug to its abutment, or zero movement position, then retracting the lug by the desired number of full turns, and taking this number in connection with the reading on the calibrated scale to indicate the setting of the tool bit maximum movement. However, if a coarse scale is desired it can be provided quite simply by cutting a window in housing 24 and marking a coarse scale thereon to indicate the number of full turns the screw is moved from its zero position. This arrangement might be useful in applications where the depth of the cut is to be changed frequently.

If the drill chuck with tool T mounted in it is now moved downwardly along axis 12a toward the work piece, a reacting upward force is developed at the bottom of tool post 13 when abutment 15 bears on the surface of the workpiece, which is rigidly mounted on the drill press. This force causes post 13 to move upward into, or toward, the tool body, compressing spring 20. The angular orientation of the tool post in the body is secured during this sliding movement by pin 19 engaging the sides of keyway 19'. As the post 13 moves toward the tool body for a given distance, the tool bit 17 moves radially outward from axis 12a (to the right on Fig. 2) by an amount which is a function of the inclination angle A of the post relative to axis 12a. Edge 17 engages the bore wall at a distance below the end of the bore which is determined by the distance between the bearing surface on abutment 15 and the cutting edge 17 of the tool bit. The tool bit upon being rotated by the drill press, cuts a cylindrical groove G inside the bore B. The axial position of the cutting tool with respect to the work piece is held constant by the abutment 15.

Abutment 15 in the form shown has several functions, or advantages. By being removable, the abutment provides means for readily changing the distance in from the end of the bore that the groove G is cut. This distance may be changed by changing the length of the sleeve or by adding or removing shims between the abutment and the end of post 13. Primarily the abutment acts like an extension of the tool post to hold tool 14 against movement along or parallel to axis 12a by engaging surface 35 of the work piece. Hence as body 10 approaches the work piece, the cutting edge is moved radially outward to cut the groove around bore B. Also the engagement of the abutment with a steady surface acts much the same as a live center and reduces the chatter or vibration of the cutting tool, to obvious advantage. In a broad sense, the abutment need not bear against the work piece, as any fixed surface is adequate; but for practical reasons, the work piece will be engaged. Thus surface 35 becomes an indexing surface determining the location of groove G.

The maximum possible travel of tool post 13 into the body is a distance equal to the length of keyway 19', as pin 19 then engages the bottom end of the keyway and limits any further movement. In the embodiment here disclosed a movement of the tool post 13 from its maximum outward position shown in solid lines to an inward position 13a shown in dot-dash lines is a result of downward movement of body 10 to position 10a which causes a radial displacement of tool bit 17 equal to the distance d indicated in Fig. 2. Radial movement of the cutting tool relative to the work piece cuts the groove G indicated by the dashed lines in Fig. 2 as the tool T is rotated. It can be seen that an identical groove could be cut in another work piece by merely clamping the second piece in the same position on the drill press and moving the chuck downward through the same range of movement.

The invention is not limited to cutting internal grooves, or to cutting single grooves, or to use a drill press as illustrated in this specific embodiment of the invention. If desired the tool assembly may be held stationary, as in a lathe, and the cutting accomplished by rotating the work piece. It is also possible to use the tool as a boring bar by setting pin 19 to lock post 13 in place. If tool 17 is appropriately ground, groove G can now be widened by removing metal on the side of the groove toward the tool T.

Multiple grooves can be cut quite simply by forming the tool bit to have plural cutting edges, or by adding an adapter which will hold multiple bits in appropriate relation to the work piece, or by changing the length of the abutment sleeve. Furthermore, the invention may be adapted for cutting exterior grooves on a solid work piece. Other modifications may be added to meet the requirements of a specific application. For example, if the dynamic unbalance of the embodiment shown in the drawings proves troublesome in some application, the assembly may be balanced quite simply by adding a mass to the left hand side of the assembly as shown in Fig. 2, with the added mass having a moment of inertia equal to the mass shown on the right hand side of Fig. 2. It might also be desirable in some applications to add a bearing plate attached to the tool post 13 by ball bearings to reduce wear by friction on the upper surface of the work piece. In case the upper surface of the work piece is tapered or curved instead of flat, it may be necessary to extend or change the arms on the abutment 15. Modifications such as this, however, cannot be specified exactly except in reference to some specific use of the invention, and therefore are not described in detail. They are, however, well understood by those skilled in the art, and it should be apparent which modifications are desirable in adapting the invention to any specific application.

The choice of dimensions and angles for any specific embodiment of the invention are likewise dependent on the specific application, and well within the skill of the art, but it may be helpful to add a note on some of the general design considerations involved in the choice thereof. The angle between the tool post and the shank determines the relationship between the axial movement of the tool post and the corresponding radial movement of the tool bit. The greater the angle, the greater the radial movement of the tool bit for a unit of axial movement of the tool post. Specifically, the radial movement of the tool bit is equal to the axial movement of the tool post multiplied by the cosine of the angle A between the tool post and the tool shank. An angle of about 15 degrees is satisfactory for most work, but a larger or smaller angle may be used if desired.

The maximum length of movement of the tool post depends on the angle of inclination and on the desired maximum amount of radial movement of the tool bit. In applications where the desired movement is quite small, or the angle of inclination quite large, it will be possible to make the length of the tool post shorter than shown in the embodiment disclosed in Fig. 2. In other cases, however, it may be necessary to make it longer. The calibration of the scale on the adjustment head depends on the units desired, the pitch of the adjustment screw and the angle of inclination of the post. While any arbitrary unit may be selected, it is convenient if the graduations each indicate a radial movement of one one-thousandths of an inch of the cutting edge 17.

Having thus described one specific embodiment of our invention and the factors bearing on the design of other embodiments, it should be clearly understood that the invention is not limited to the specific embodiment disclosed, but includes all other modifications falling within the scope of the following claims.

We claim:

1. A grooving tool of the character described, comprising:

a body having a bore, the axis of which is coplanar with the axis of said body and inclined at an angle thereto, the body also having a slot extending axially of and communicating with said bore;

a tool post slidable within and co-axial of said bore;

a keyway having upper and lower limiting boundaries cut into said tool post parallel with the axis thereof;

a pin attached to said body projecting into said keyway and adapted to engage the upper and lower limiting boundaries thereof;

said tool post projecting beyond the tool body and slidable therewithin between the limits determined by the limiting boundaries of said keyway;

a cutting tool mounted on the lower end of said tool post;

abutment means fixed relative to said tool post and adapted to bear against a work piece being cut by said tool bit to cause relative movement of the tool post and the body as the body approaches the work piece; a traveling block having a lug movable within said slot and extending therethrough into said bore, said lug being adapted to abut against one end of the tool post; and adjustment screw means engaging threads cut into said traveling block, said screw means being rotatably mounted in said body but constrained from axial movement relative thereto; and lock means operable to secure the position of said lug member along said slot.

2. The combination defined in claim 1, that also includes a compression spring within said bore between one end thereof and the opposing end of said tool post;

a spring positioner rigidly attached to said tool post and extending within said spring; and a housing attached to said tool body covering said adjustment screw means; and wherein said lock means comprises a set screw attached to said housing near said traveling block, said set screw being operable to be moved to bear against said traveling block and hold it fixed in any position along said slot.

3. A grooving tool comprising: a body having means establishing an axis about which the tool is rotated and having a bore with its axis inclined to said axis of rotation;

a tool post slidably mounted in said bore and extending beyond the body; a cutting tool mounted on the tool post; spring means between the tool post and body to urge the post out of the body; means limiting the travel of the tool post along its axis relative to the body, said limiting means including a slot cut into said body and extending axially of and in communication with said bore, a traveling block having a lug movable axially within said slot and extending therethrough into said bore, said lug being adapted to abut against an end of the tool post, and adjustment screw means engaging said traveling block and rotatably mounted in said body but constrained from axial movement relative thereto to produce movement of said traveling block upon rotation of the screw means; and abutment means mounted on the tool post to engage the surface of a work piece around a bore therein into which said tool extends.

References Cited in the file of this patent

UNITED STATES PATENTS 2,848,912     Kalat                 Aug. 26, 1958

FOREIGN PATENTS 191,698      Germany              Nov. 14, 1907